United States Patent
Reuter et al.

(10) Patent No.: US 10,919,508 B2
(45) Date of Patent: Feb. 16, 2021

(54) MASTER CYLINDER AND BRAKE-BY-WIRE SYSTEM

(71) Applicant: BWI (Shanghai) Co., Ltd., Shanghai (CN)

(72) Inventors: David Fredrick Reuter, Moraine, OH (US); Dongqiang Luo, Shanghai (CN)

(73) Assignee: BWI (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/507,601

(22) Filed: Jul. 10, 2019

(65) Prior Publication Data

US 2021/0009099 A1 Jan. 14, 2021

(51) Int. Cl.
*B60T 11/20* (2006.01)
*B60T 8/26* (2006.01)
*B60T 7/04* (2006.01)

(52) U.S. Cl.
CPC .............. *B60T 11/20* (2013.01); *B60T 7/042* (2013.01); *B60T 8/267* (2013.01); *B60T 2270/82* (2013.01)

(58) Field of Classification Search
CPC ................................. B60T 11/20; B60T 11/16
See application file for complete search history.

(56) References Cited

U.S. PATENT DOCUMENTS

| | | | | |
|---|---|---|---|---|
| 3,910,048 A | * | 10/1975 | Gardner | B60T 13/565 60/568 |
| 4,126,996 A | | 11/1978 | Leiber | |
| 4,189,190 A | * | 2/1980 | Luepertz | B60T 8/262 188/344 |
| 4,425,005 A | | 1/1984 | Warwick | |
| 4,456,310 A | * | 6/1984 | Hayashi | B60T 8/3225 188/181 R |
| 4,465,322 A | * | 8/1984 | Hayashi | B60T 8/261 303/115.6 |
| 4,649,707 A | | 3/1987 | Belart | |

(Continued)

FOREIGN PATENT DOCUMENTS

| | | |
|---|---|---|
| CN | 201362250 Y | 12/2009 |
| CN | 101879891 B | 11/2010 |

(Continued)

OTHER PUBLICATIONS

First Office Action and search report dated Apr. 10, 2020 for counterpart Chinese patent application No. 201910689072.4, along with machine EN translation downloaded from EPO.

*Primary Examiner* — Thomas E Lazo
(74) *Attorney, Agent, or Firm* — William H. Honaker; Dickinson Wright PLLC (57) ABSTRACT

A master cylinder includes: a cylinder body; an isolation wall provided inside the cylinder body, arranged between a first chamber and a second chamber to isolate the first chamber and the second chamber, wherein, the isolation wall is integrally formed with the cylinder body; a first piston; a second piston; a first rod provided in connection with the first piston; a second rod provided inside the cylinder body, being in connection with the first piston, wherein, the second rod is supported in the isolation wall; and a cap provided at a first opening of the cylinder body, the first opening is at an end of the second chamber along the axial direction. A brake-by-wire system including the master cylinder is also disclosed herein.

15 Claims, 4 Drawing Sheets

(56) References Cited

U.S. PATENT DOCUMENTS

| | | | |
|---|---|---|---|
| 4,834,467 A | 5/1989 | Zirps | |
| 5,729,979 A | 3/1998 | Shaw et al. | |
| 8,500,217 B2 * | 8/2013 | Isono | B60T 8/3655 |
| | | | 303/113.4 |
| 10,059,321 B2 * | 8/2018 | van Zanten | B60T 13/662 |
| 2005/0236892 A1 | 10/2005 | Kusano | |
| 2013/0318963 A1 * | 12/2013 | Masuda | B60T 13/147 |
| | | | 60/591 |
| 2018/0273009 A1 * | 9/2018 | Ishikawa | B60T 13/745 |
| 2019/0009759 A1 * | 1/2019 | Zhang | B60T 8/265 |
| 2020/0139948 A1 * | 5/2020 | Leiber | B60T 8/4022 |

FOREIGN PATENT DOCUMENTS

| | | | | |
|---|---|---|---|---|
| CN | 103010199 B | | 4/2013 | |
| CN | 103303285 A | | 9/2013 | |
| CN | 203460856 U | | 3/2014 | |
| CN | 106573600 A | | 4/2017 | |
| CN | 107499296 A | | 12/2017 | |
| DE | 1555368 A1 | | 10/1970 | |
| DE | 2426294 A1 | | 12/1975 | |
| DE | 3919217 A1 | | 2/1991 | |
| DE | 10201711356 A1 | | 12/2018 | |
| DE | 102017113563 A1 | * | 12/2018 | B60T 8/4081 |
| JP | 1997099834 A | | 4/1997 | |
| JP | 2003312468 A | | 11/2003 | |

* cited by examiner

MASTER CYLINDER AND BRAKE-BY-WIRE SYSTEM

TECHNICAL FIELD

The present disclosure relates to hydraulic brake system components. More particularly, the present disclosure relates to a master cylinder and a brake-by-wire system.

The present invention relates generally to tires and more specifically to a program or application to determine the present value of used tires. The program can be used with any tire, such as, for example, agricultural tires, commercial vehicles tires, both on and offroad, passenger vehicle tires, including trucks, passenger cars, and motorcycles, and aviation tires.

BACKGROUND

Master cylinders are often designed for use with hydraulic braking systems for vehicles. Master cylinders are commonly incorporated into braking assemblies in a variety of vehicles such as, for example, towing trailers, motorcycles, and the like.

In a master cylinder, a piston is slidably fitted in a cylinder body to which operating fluid is introduced from a reservoir, and the cylinder body defines therein a pressure chamber in which the operating fluid is pressurized according to an operation of the piston. The pressure chamber is connected via a pipe to a hydraulic device of a brake system or the like, such that the hydraulic device is operated according to an operation of the piston. The cylinder body is provided with a supply passage for supplying the operating fluid from the reservoir to the pressure chamber, to prevent a pressure in the pressure chamber from becoming negative during an operation of returning the piston or the like.

There are now numerous master cylinders on the market. It was found by the inventors that most of the master cylinders include a number of components. For example, the master cylinder incorporates numbers of components to divide a chamber of the master cylinder into two isolated parts. Therefore, the cost and complexity of the master cylinders are relatively high. It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY OF THE DISCLOSURE

The present disclosure provides a master cylinder and a brake-by-wire system. The master cylinder utilizes a wall that is integrally formed with a cylinder body to isolate a first chamber and a second chamber, and a rod is used to apply pressure on a second piston in case of fluid loss in the first chamber. Therefore, the cost and complexity of the master cylinder is lower, and improved security of the master cylinder is achieved.

It is one aspect of the present disclosure to provide a master cylinder. The master cylinder includes:

a cylinder body provided with a first chamber and a second chamber arranged along an axial direction;

an isolation wall provided inside the cylinder body, being arranged between the first chamber and the second chamber to isolate the first chamber and the second chamber, wherein, the isolation wall is integrally formed with the cylinder body;

a first piston provided at least partly in the first chamber, the first piston being movable along the axial direction;

a second piston provided in the second chamber, the second piston being movable in the axial direction;

a first rod provided in connection with the first piston;

a second rod provided inside the cylinder body, being in connection with the first piston, wherein, the second rod is supported in the isolation wall; and a cap provided at a first opening of the cylinder body, wherein, the first opening is at an end of the second chamber along the axial direction.

According to an embodiment of the present disclosure, a snap ring is provided in the second chamber, the snap ring is attached to a bore of the second chamber and arranged behind the cap.

According to an embodiment of the present disclosure, a first spring is provided to connect the snap ring and the second piston.

According to an embodiment of the present disclosure, a first guide bushing is provided around the second rod, the first guide bushing is press-fit assembled in the isolation wall.

According to an embodiment of the present disclosure, a sealing ring is provided in the isolation wall.

According to an embodiment of the present disclosure, a stepped bore is provided in a front end of the first piston, a rear end of the second rod is incorporated in the stepped bore.

According to an embodiment of the present disclosure, a retaining washer is installed in the stepped bore in front of the rear end of the second rod.

According to an embodiment of the present disclosure, a mounting bracket is provided around the first piston, the mounting bracket extends along the axial direction and is attached to a back end of the cylinder body.

According to an embodiment of the present disclosure, a step portion is provided in a bore of the mounting bracket, a diameter of the step portion is smaller than a diameter of a first part of the first piston, the first part of the first piston is arranged in front of the step portion in the axial direction.

According to an embodiment of the present disclosure, a clearance between an outer wall of the first piston and the bore of the mounting bracket in front of the step portion is smaller than a clearance between the outer wall of the first piston and the bore of the mounting bracket behind the step portion.

According to an embodiment of the present disclosure, an insertion portion is provided between the outer wall of the first piston and the bore of the mounting bracket behind the step portion.

According to an embodiment of the present disclosure, a hollow portion is provided in a rear part of the first piston, the first rod is incorporated in the hollow portion via a retainer, the retainer comprises a wear plate and a housing, the wear plate contacts with a front end of the first rod, the housing surrounds the front end of the first rod.

According to an embodiment of the present disclosure, at least one flange is attached to a bore of the hollow portion, a return spring is arranged between the flange and the mounting bracket.

According to an embodiment of the present disclosure, at least one sensor is arranged on the flange.

According to another aspect of embodiments of the present disclosure, a brake-by-wire system is provided, the brake-by-wire system includes the master cylinder according to any one of above mentioned embodiments.

An advantage of the embodiments of the present disclosure exists in that the cost and complexity of the master cylinder is lower, and improved security of the master cylinder is achieved.

With reference to the following description and drawings, the particular embodiments of the present disclosure are disclosed in detail, and the principle of the present disclosure and the manners of use are indicated. It should be understood that the scope of the embodiments of the present disclosure are not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiment of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Furthermore, in the following description of this disclosure, for the sake of convenience of explanation, a direction of radius taking a central axis C of a bore of a cylinder body as a center is referred to as "a radial direction", a direction of a circumference taking the central axis as a center is referred to as "a circumferential direction", a direction along a direction of the central axis is referred to as "an axial direction", a direction of the "axial direction" pointing from a first chamber to a second chamber is referred to as "a forward direction", and a direction opposite to the "forward direction" is referred to as "a backward direction".

A First Aspect of Embodiments

Figure 1:
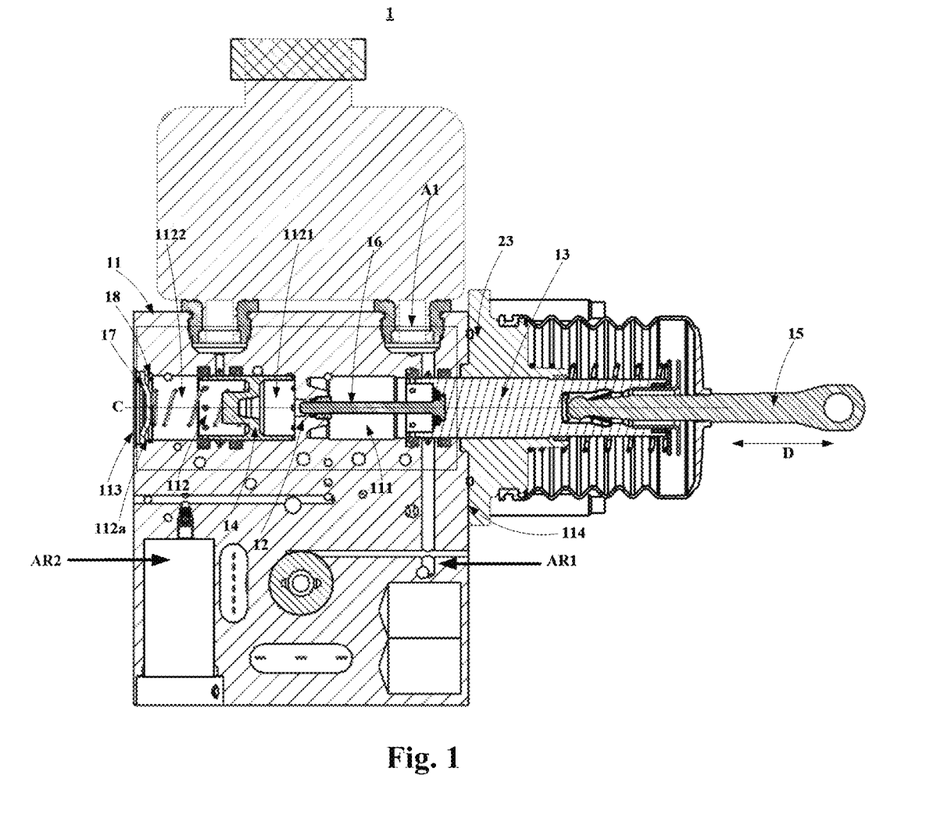
FIG. 1 is an axial cross-sectional view of a master cylinder of according to one embodiment of the present disclosure.

Embodiments of this disclosure provide a master cylinder. The master cylinder 1 constructed in accordance with one embodiment of the present disclosure is generally shown in FIG. 1. The master cylinder 1 includes a cylinder body 11, an isolation wall 12, a first piston 13, a second piston 14, a first rod 15, a second rod 16 and a cap 17.

As shown in FIG. 1, in some embodiments, the cylinder body 11 has a first chamber 111 and a second chamber 112. The first chamber 111 and the second chamber 112 is arranged along an axial direction D. In other words, the first chamber 111 and the second chamber 112 are in a tandem relationship with one another. For example, the first chamber 111 can be located in the back of the second chamber 112.

In some embodiments, the isolation wall 12 is arranged inside the cylinder body 11. The isolation wall 12 is arranged between the first chamber 111 and the second chamber 112 to isolate the first chamber 111 and the second chamber 112. The isolation wall 12 is integrally formed with the cylinder body 11.

In some embodiments, the first piston 13 is at least partially provided in the first chamber 111. For example, a front part of the first piston 13 is located inside the first chamber 111 and the rear part of the piston 13 is located outside of the first chamber 111. The first piston 13 is movable along the axial direction D.

In some embodiments, the second piston 14 is provided in the second chamber 112. The second piston 14 is movable in the axial direction D. The second piston 14 divides the second chamber 112 into two isolated parts 1121, 1122, which includes a first part 1121 and a second part 1122. The first part 1121 is incorporated in a primary circuit for supplying a fluid. The second part 1122 is incorporated in a secondary circuit for supplying the fluid.

In some embodiments, the first rod 15 is connected with the first piston 13. For example, the first rod 15 can be arranged behind the first piston 13 along the axial direction D, and a front part of the first rod 15 is incorporated in the first piston 13.

In some embodiments, the second rod 16 is provided inside the cylinder body 11 and in connection with the first piston 13. For example, the second rod 16 can be arranged in front of the first piston 13 along the axial direction D, and a rear part of the second rod 16 is incorporated in the first piston 13.

As shown in FIG. 1, the second rod 16 is supported in the isolation wall 12, so that the second rod 16 penetrates the isolation wall and enters into the second chamber 112 to push the second piston 14 when the first piston 13 pushes the second rod 16 along the axial direction.

As shown in FIG. 1, the cap 17 is provided at a first opening 113 of the cylinder body 11. The first opening 113 is at an end 112a of the second chamber 112 along the axial direction D, for example, the end 112a is a front end of the second chamber 112. The cap 17 is used to seal the first opening 113, to prevent fluid losing from the first opening 113.

As shown in FIG. 1, from a front part of the master cylinder 1 to a rear part of the master cylinder 1, components are arranged in a following order: the cap 17, the second piston 14, the isolation wall 12, the second rod 16, the first piston 13 and the first rod 15.

According to the first aspect of embodiments, the master cylinder 1 utilizes the isolation wall 12 that is integrally formed with the cylinder body 11 to isolate the first chamber 111 and the second chamber 112, and the second rod 16 is used to apply pressure on the second piston 14 in case of fluid loss in the first chamber 111. Therefore, the cost and complexity of the master cylinder is lower, and improved security of the master cylinder 1 is achieved.

Figure 2:
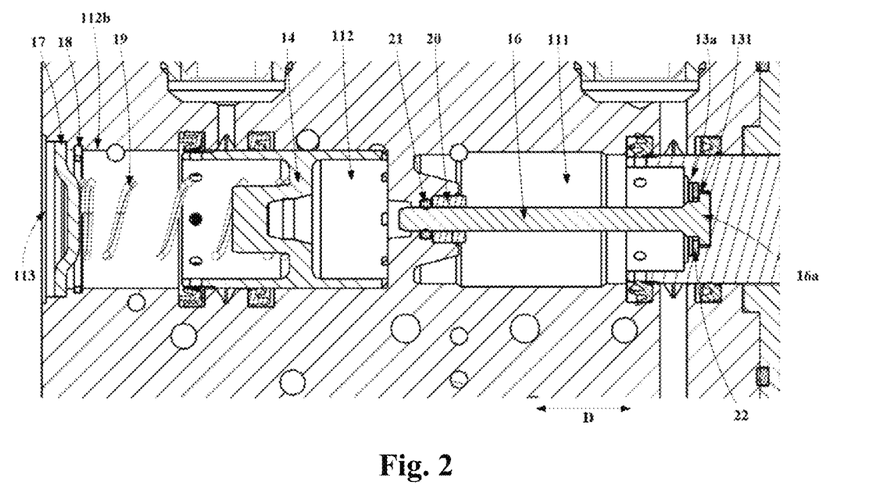
FIG. 2 is an enlarged cross-sectional view of a dotted rectangular part A1 in FIG. 1.

FIG. 2 is an enlarged cross-sectional view of a dotted rectangular part A1 in FIG. 1. As shown in FIG. 1 and FIG. 2, in some embodiments, a snap ring 18 is provided in the second chamber 112. The snap ring 18 is attached to a bore 112b of the second chamber 112 and arranged behind the cap 17. For example, an outer rim of the snap ring 18 is embedded in the bore 112b of the second chamber 112. In case of the cap 17 escapes from the first opening 113, the snap ring 18 still stays in the bore 112b of the second chamber 112, to prevent the second piston 14 from escaping out of the second chamber 112.

As shown in FIG. 2, a first spring 19 is provided to connect the snap ring 18 and the second piston 14. When the second rod 16 pushes the second piston 14, the second piston 14 moves axially in the second chamber 112 toward the snap ring 18 which increases the fluid pressure thereby generating a brake force in a brake-by-wire system. As the second rod 16 pushes the second piston 14, the first spring 19 compresses. When the second rod 16 is released, the first spring 19 generates a restoring force in the second part 1122 of the second chamber 112 thereby returning the second piston 14 to its original position.

As shown in FIG. 2, in some embodiments, a first guide bushing 20 is provided around the second rod 16. The first guide bushing 20 is press-fitted in the isolation wall 12. The first guide bushing 20 guides the second rod 16 to move along the axial direction.

In some embodiment, a press force travel and displacement is employed during the manufacturing process of the second rod 16 with force magnitudes above what is seen from the hydraulic loads, thereby ensuring a proper fit of the first guide bushing 20.

As shown in FIG. 2, in some embodiments, a sealing ring 21 is provided in the isolation wall 12. The sealing ring 21 has a generally O-shape or H-shape. The sealing ring 21 is in a sealing engagement with the second rod 16 to isolate the first chamber 111 from the second chamber 112.

As shown in FIG. 2, in some embodiments, a stepped bore 131 is provided in a front end 13a of the first piston 13. A rear end 16a of the second rod 16 is incorporated in the stepped bore 131. The rear end 16a of the second rod 16 is a head of the second rod 16.

A clearance between the rear end 16a of the second rod 16 and the stepped bore 131 is larger than a predetermined value, so that the second rod 16 is able to float with adequate clearance inside the stepped bore 131. Therefore, the second rod 16 does not bind when moving along the axial direction D.

As shown in FIG. 2, in some embodiments, a retaining washer 22 is installed in the stepped bore 131 in front of the rear end 16a of the second rod 16. For example, the retaining washer 22 is staked in the stepped bore 131. Thus the first piston 13 is able to apply a pulling force on the second rod 16 via the retaining washer 22.

In some embodiment, the second rod 16 is a low-cost cold headed design as used in the manufacturing of screws and nails, so as to optimize construction.

Figure 3:
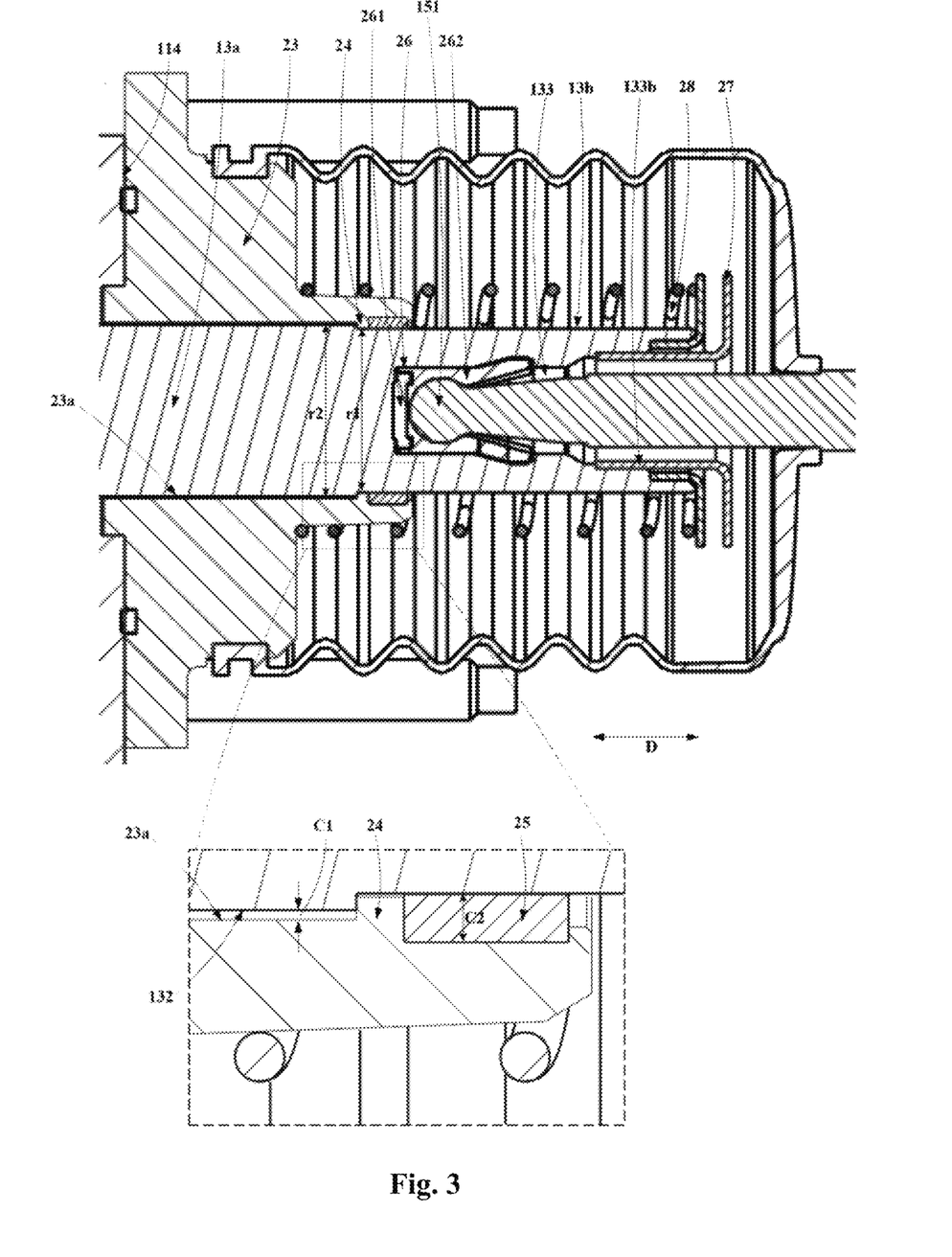
FIG. 3 is a cross-sectional fragmentary view of a first piston and a first rod of the master cylinder.

FIG. 3 is an enlarged view near the first piston and the first rod. As shown in FIG. 3 and FIG. 1, in some embodiments, a mounting bracket 23 is provided around the first piston 13. The mounting bracket 23 extends along the axial direction D and is attached to a back end 114 of the cylinder body 11. For example, the mounting bracket 23 is attached to the cylinder body 11 with screws (not shown).

As shown in FIG. 3, in some embodiments, a step portion 24 is provided in a bore 23a of the mounting bracket 23. A diameter r1 of the step portion 24 is smaller than a diameter r2 of a first part 13a of the first piston 13. For example, the first part 13a of the first piston 13 is arranged in front of the step portion 24 in the axial direction D. The step portion 24 provides a low cost structure of retaining the first piston 13 against pull-out loads up to 2,000 N.

As shown in FIG. 3, in some embodiments, a front part in front of the step portion 24 serves as an integral guide bushing which allows for a precise location and guidance of the first piston 13.

As shown in FIG. 3, in some embodiments, a clearance C1 between an outer wall 132 of the first piston 13 and the bore 23a of the mounting bracket 23 in front of the step portion 24 is smaller than a clearance C2 between the outer wall 132 of the first piston 13 and the bore 23a of the mounting bracket 23 behind the step portion 24. Tight clearances C1 around the integral guide bushing and loose clearances C2 in the remainder of the bore 23a allow for optimum piston fit and the ability to absorb first rod side loads while preventing binding of the first piston 13.

As shown in FIG. 3, in some embodiments, an insertion portion 25 is provided between the outer wall 132 of the first piston 13 and the bore 23a of the mounting bracket 23 behind the step portion 24 for absorbing the side loads of the first rod 15.

As shown in FIG. 3, in some embodiments, a hollow portion 133 is provided in a rear part 13b of the first piston 13. The first rod 15 is incorporated in the hollow portion 133 via a retainer 26. The retainer 26 is a 2-piece assembly including a wear plate 261 and a housing 262. The wear plate 261 contacts with a front end 151 of the first rod 15 and the housing 262 surrounds the front end 151 of the first rod 15. It should be appreciated that the housing 262 is made of plastic, and the wear plate 261 is integrally formed with the first piston 13. The first piston 13 is able to be assembled with the cylinder body 11 prior to the installation of the first rod 15.

As shown in FIG. 3, in some embodiments, at least one flange 27 is attached to a bore 133a of the hollow portion 133. According to one embodiment of the present disclosure, the flange 27 can be a deep-drawn, press-fit flange.

As shown in FIG. 3, in some embodiments, a return spring 28 is arranged between the flange 27 and the mounting bracket 23.

In some embodiments, at least one sensor is arranged on the flange. The sensor can be a displacement sensor.

As shown in FIG. 3, a bore of the cylinder body 11 is open at both ends with the second chamber 112 being sealed with a low cost, stamped steel end cap 17 and the snap ring 18. The cap 17 is retained by the simple manufacturing process of staking. This allows for drilling from both ends of the cylinder body 11 as shown by arrows AR1 and AR2 (shown in FIG. 1) which eases and improves the quality of the bore undercuts for main seals as the reach into the bore by the grooving tool is cut in half. Further, the isolation wall 12 between the first chamber 111 and the second chamber 112 is integral with the cylinder body 11 as opposed to being a separate piece with seals and retaining ring as is typical of this design, thus the cost and complexity of the master cylinder 1 is lower. Further, the second rod 16 is incorporated in the master cylinder 1 to improve the security of the master cylinder 1.

A Second Aspect of Embodiments

Figure 4:
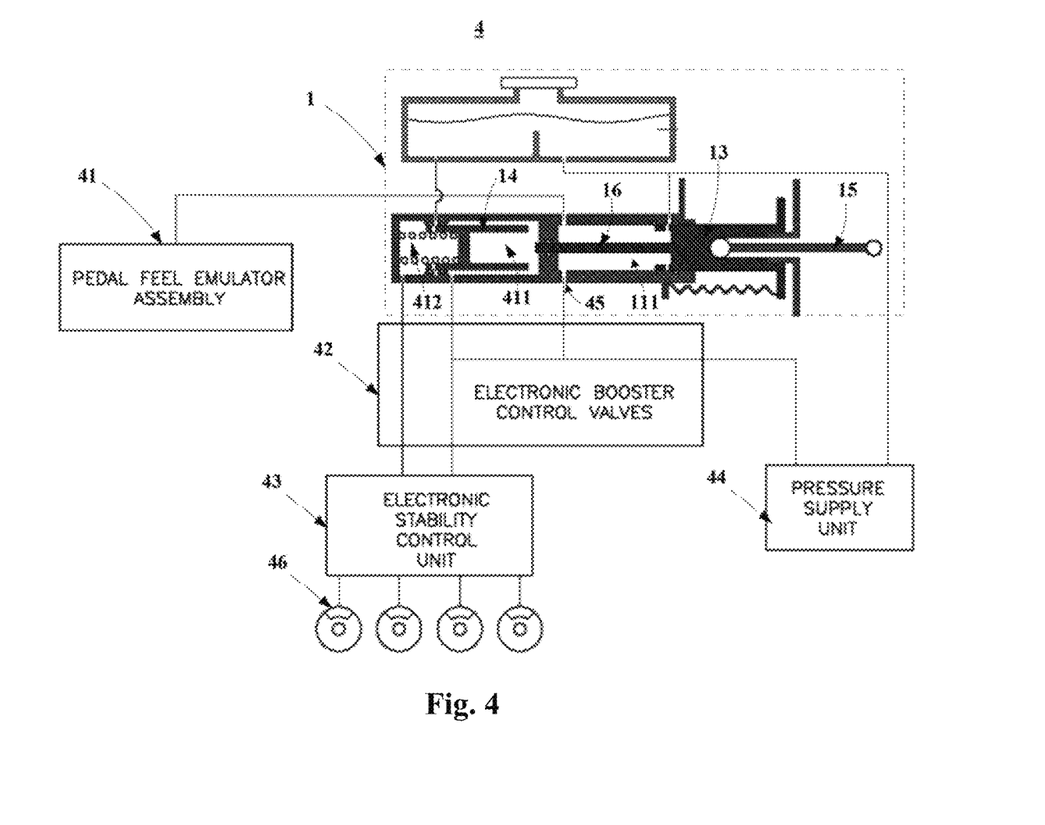
FIG. 4 is a diagram of the brake-by-wire system according to one embodiment of the present disclosure.

It is another aspect of the present disclosure to provide a brake-by-wire system. The brake by wire system, constructed in accordance with one embodiment of the present disclosure, is generally shown in FIG. 4. The brake-by-wire system 4 includes a pedal feel emulator assembly 41, a master cylinder 1, electronic booster control valves 42, an electronic stability control unit 43 and a pressure supply unit 44. In some embodiments, the master cylinder 1 has been described in the first aspect of embodiments.

As shown in FIG. 4, in some embodiments, the first part 1121 of the chamber 112 is incorporated in a primary circuit 411, the second part 1122 of the chamber 112 is incorporated in a secondary circuit 412. The first piston 13 serves as an actuator for the pedal feel emulator 41 when the pedal feel emulator valve (not shown) is opened.

In some embodiments, if the pressure supply unit 44 is in normal operation, a valve 45 in the master cylinder 1 is closed. When the first rod 15 pushes the first piston 13, the first piston 13 moves forward. In response, fluid in the first chamber 111 flows into the pedal feel emulator assembly 41 and the pedal feel emulator assembly 41 generates a resistance pressure to provide a pedal feel. At the same time, the fluid in the first chamber 111 also flows into the pressure supply unit 44. The pressure supply unit 44 generates a control signal according to a pressure of the fluid flowing out of the first chamber 111. The electronic booster control valves 42 regulates the fluid flow into the primary circuit 411 to push the second piston 14 according to the control signal. Then, the fluid in the second secondary circuit 412 flows into the electronic stability control unit 43 to provide a brake force to the wheel brakes 46.

In the event of a failure of the pressure supply unit 44, the valve 45 in the master cylinder 1 opens thereby allowing the fluid in the first chamber 111 to flow. As the first rod 15 pushes the first piston 13, the first piston 13 moves forward. Accordingly, the second rod 16 also moves forward contacting and pushing the second piston 14 forward thereby allowing the fluid in the second secondary circuit 412 to flow into the electronic stability control unit 43 to provide a brake force to the wheel brakes 46.

Therefore, reliability of the brake-by-wire system 4 in the embodiments are strengthened because of the second rod 16 in case of fluid loss.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A master cylinder, comprising:
   a cylinder body defining a first chamber and a second chamber arranged along an axial direction;
   an isolation wall provided inside the cylinder body, located between the first chamber and the second chamber to isolate the first chamber and the second chamber, wherein, the isolation wall is integrally formed with the cylinder body;
   a first piston at least partially disposed in the first chamber and movable along the axial direction;
   a second piston provided in the second chamber and movable in the axial direction;
   a first rod disposed in connection with the first piston;
   a second rod provided inside the cylinder body, being in connection with the first piston, wherein, the second rod is supported in the isolation wall;
   a cap provided at a first opening of the cylinder body, wherein the first opening is at an end of the second chamber along the axial direction;
   a snap ring provided in the second chamber with the snap ring being attached to a bore of the second chamber and arranged behind the cap; and
   a first spring connecting the snap ring and the second piston.

2. A master cylinder, comprising:
   a cylinder body defining a first chamber and a second chamber arranged along an axial direction;
   an isolation wall provided inside the cylinder body, located between the first chamber and the second chamber to isolate the first chamber and the second chamber, wherein, the isolation wall is integrally formed with the cylinder body;
   a first piston at least partially disposed in the first chamber and movable along the axial direction;
   a second piston provided in the second chamber and movable in the axial direction;
   a first rod disposed in connection with the first piston;
   a second rod provided inside the cylinder body, being in connection with the first piston, wherein, the second rod is supported in the isolation wall;
   a cap provided at a first opening of the cylinder body, wherein the first opening is at an end of the second chamber along the axial direction; and
   a first guide bushing provided around the second rod with the first guide bushing being press-fitted in the isolation wall.

3. The master cylinder according to claim 1 further including a sealing ring is provided in the isolation wall.

4. The master cylinder according to claim 1 further including a stepped bore provided in a front end of the first piston, and
   a rear end of the second rod being incorporated in the stepped bore.

5. The master cylinder according to claim 4 further including a retaining washer is installed in the stepped bore in front of the rear end of the second rod.

6. A master cylinder, comprising:
a cylinder body defining a first chamber and a second chamber arranged along an axial direction;
an isolation wall provided inside the cylinder body, located between the first chamber and the second chamber to isolate the first chamber and the second chamber, wherein, the isolation wall is integrally formed with the cylinder body;
a first piston at least partially disposed in the first chamber and movable along the axial direction;
a second piston provided in the second chamber and movable in the axial direction;
a first rod disposed in connection with the first piston;
a second rod provided inside the cylinder body, being in connection with the first piston, wherein, the second rod is supported in the isolation wall;
a cap provided at a first opening of the cylinder body, wherein, the first opening is at an end of the second chamber along the axial direction; and
a mounting bracket is provided around the first piston, the mounting bracket extends along the axial direction and is attached to a back end of the cylinder body.

7. The master cylinder according to claim 6 further including
a step portion provided in a bore of the mounting bracket, a diameter of the step portion is smaller than a diameter of a first part of the first piston,
wherein the first part of the first piston is arranged in front of the step portion in the axial direction.

8. The master cylinder according to claim 7 further including
a clearance between an outer wall of the first piston and the bore of the mounting bracket in front of the step portion being smaller than a clearance between the outer wall of the first piston and the bore of the mounting bracket behind the step portion.

9. The master cylinder according to claim 7 further including an insertion portion provided between the outer wall of the first piston and the bore of the mounting bracket behind the step portion.

10. The master cylinder according to claim 6 further including a hollow portion provided in a rear part of the first piston,
wherein the first rod is incorporated in the hollow portion via a retainer,
the retainer comprises a wear plate and a housing with the wear plate contacting a front end of the first rod and the housing surrounding the front end of the first rod.

11. The master cylinder according to claim 10 further including at least one flange attached to a bore of the hollow portion, and
a return spring arranged between the flange and the mounting bracket.

12. The master cylinder according to claim 10 further including at least one sensor is arranged on the flange.

13. A brake-by-wire system, comprising a master cylinder, the master cylinder comprises:
a cylinder body defining a first chamber and a second chamber arranged along an axial direction;
an isolation wall provided inside the cylinder body, located between the first chamber and the second chamber to isolate the first chamber and the second chamber, wherein, the isolation wall is integrally formed with the cylinder body;
a first piston at least partially provided in the first chamber and movable in the axial direction;
a second piston provided in the second chamber and movable in the axial direction;
a first rod provided in connection with the first piston;
a second rod provided inside the cylinder body, being in connection with the first piston, wherein, the second rod penetrates the isolation wall;
a cap provided at a first opening of the cylinder body, wherein, the first opening is at an end of the second chamber along the axial direction;
a snap ring provided in the second chamber with the snap ring being attached to a bore of the second chamber and arranged behind the cap; and
a first spring connecting the snap ring and the second piston.

14. A brake-by-wire system, comprising a master cylinder, the master cylinder comprises:
a cylinder body defining a first chamber and a second chamber arranged along an axial direction;
an isolation wall provided inside the cylinder body, located between the first chamber and the second chamber to isolate the first chamber and the second chamber, wherein, the isolation wall is integrally formed with the cylinder body;
a first piston at least partially disposed in the first chamber and movable along the axial direction;
a second piston provided in the second chamber and movable in the axial direction;
a first rod disposed in connection with the first piston;
a second rod provided inside the cylinder body, being in connection with the first piston, wherein, the second rod is supported in the isolation wall;
a cap provided at a first opening of the cylinder body, wherein, the first opening is at an end of the second chamber along the axial direction; and
a first guide bushing provided around the second rod with the first guide bushing being press-fitted in the isolation wall.

15. A brake-by-wire system, comprising a master cylinder, the master cylinder comprises:
a cylinder body defining a first chamber and a second chamber arranged along an axial direction;
an isolation wall provided inside the cylinder body, located between the first chamber and the second chamber to isolate the first chamber and the second chamber, wherein, the isolation wall is integrally formed with the cylinder body;
a first piston at least partially disposed in the first chamber and movable along the axial direction;
a second piston provided in the second chamber and movable in the axial direction;
a first rod disposed in connection with the first piston;
a second rod provided inside the cylinder body, being in connection with the first piston, wherein, the second rod is supported in the isolation wall;
a cap provided at a first opening of the cylinder body, wherein, the first opening is at an end of the second chamber along the axial direction; and
a mounting bracket is provided around the first piston, the mounting bracket extends along the axial direction and is attached to a back end of the cylinder body.

* * * * *